(No Model.)
J. A. CHURCHILL.
CHAIN PUMP.
No. 249,005. Patented Nov. 1, 1881.
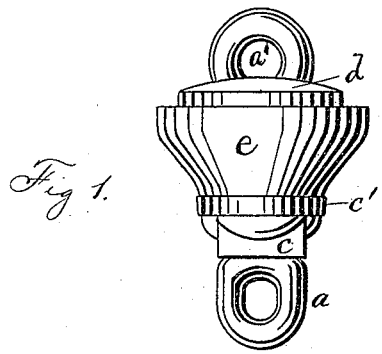
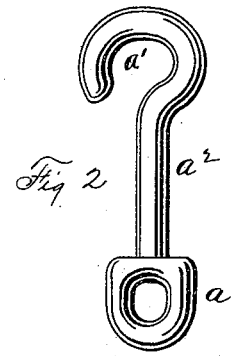
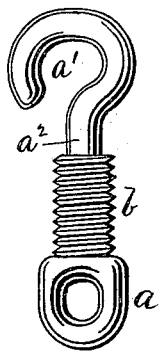
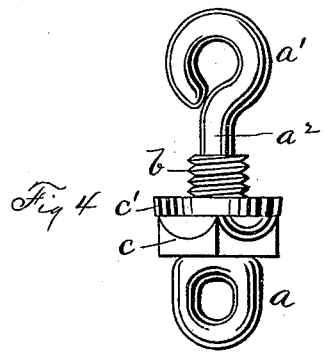
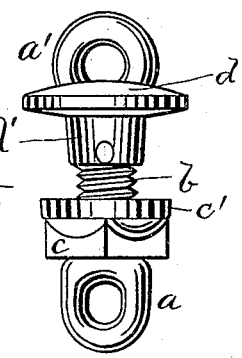
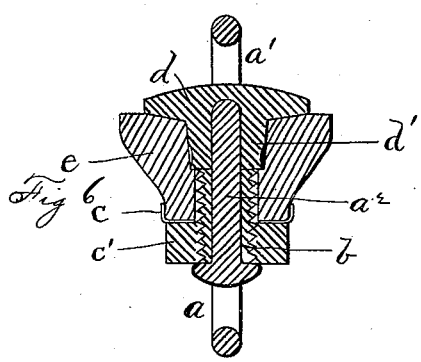
Witnesses
Claus Husbye
Chas. W. Allen
John A. Churchill Inventor
By Munday Evarts & Adcock
Attorneys

UNITED STATES PATENT OFFICE.

JOHN A. CHURCHILL, OF COUNCIL BLUFFS, IOWA.

CHAIN-PUMP.

SPECIFICATION forming part of Letters Patent No. 249,005, dated November 1, 1881.

Application filed June 16, 1880. (No model.)

*To all whom it may concern:*

Be it known that I, JOHN A. CHURCHILL, of Council Bluffs, in the county of Pottawattamie and State of Iowa, have invented certain new and useful Improvements in Chain-Pumps, of which the following is a specification.

This invention relates to the bucket-carrying links of chain-pumps. It is designed by the invention to wholly obviate the danger which exists in the old constructions of the link of the parts becoming detached.

The nature of the invention consists in the peculiarities of construction hereinafter set forth.

In the accompanying drawings, Figure 1 is an elevation of the link with the bucket in place thereon. Figs. 2, 3, 4, and 5 show the link in different stages of its manufacture, and Fig. 6 is a sectional view of both link and bucket.

In the drawings the link is shown in Fig. 2 in the first stage of manufacture. It is formed in a single piece of hard malleable metal, and as there illustrated consists of a complete eye, $a$, an incomplete eye, $a'$, and a connecting-shank, $a^2$. The next step is to apply to it the soft-metal thread $b$, which is cast around the shank adjoining the eye $a$. Then the nut $c$ and its companion washer $c'$ are slipped on, the opening in the incomplete eye $a'$ permitting this to be done, and the said eye is then finished by the closing of the opening therein, giving the parts the appearance shown at Fig. 4. The annular flange $d$ is next cast on the shank adjacent to the eye $a'$, and I prefer to make it inclose the bent end of the eye, so that the eye cannot open under any strain to which it may be subjected. This flange I form of soft metal like the thread, though that is not essential; and to give it strength as well as to solidify the rubber a sleeve, $d'$, encircling the shank, may be cast with it. The link now being complete, as shown in Fig. 5, the rubber bucket $e$ is threaded on over the flange by stretching it, and the device is ready for use, the bucket being expanded by compression against the flange in the usual way by tightening the nut $c$.

It will be noticed that in this construction the bucket is held so that it cannot slip off, because the parts which hold it are smaller than the eyes and cannot themselves be removed or work loose, and at the same time I obtain the advantages attending the use of the one-piece link.

I do not claim, broadly, a washer or flange covering the opening of the eye, because loose washers have been so applied; but my construction of cast flange is obviously better and stronger.

The washer $c'$ may be made in one piece with its companion nut $c$, or dispensed with altogether, if desired.

I claim—

1. The link consisting of the eyes and shank formed of hard malleable metal and in one piece, a soft-metal thread cast around the shank, a set-nut fitted to said thread, and a flange against which the rubber may be compressed to expand it, substantially as set forth.

2. The link the eyes and shank whereof are formed of a single piece, and provided with a soft-metal thread cast upon the shank, and a set-nut fitting said thread, substantially as specified.

JOHN A. CHURCHILL.

Witnesses:
EDW. S. EVARTS,
EDMUND ADCOCK.